Figure 1:
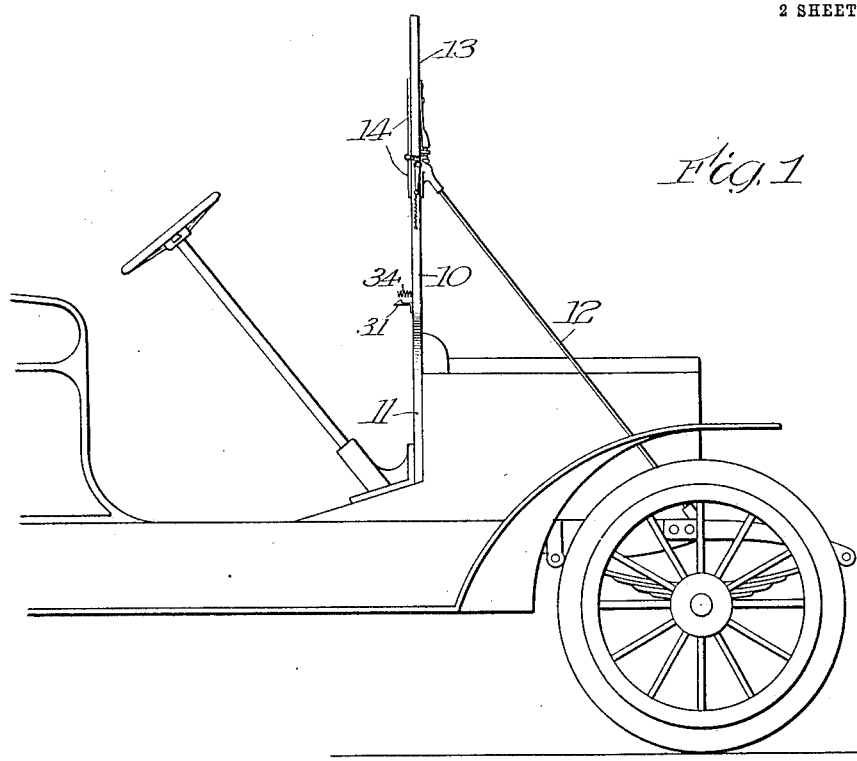

P. DE ANGUERA, Jr.
WIND SHIELD.
APPLICATION FILED MAR. 24, 1909.

1,085,113.

Patented Jan. 27, 1914.

2 SHEETS—SHEET 1.

Witnesses:
Robert H. Weir
Harold I. Barrett

Inventor:
Philip de Anguera, Jr.
by John Howard McElroy
his Atty.

COLUMBIA PLANOGRAPH CO., WASHINGTON, D. C.

P. DE ANGUERA, Jr.
WIND SHIELD.
APPLICATION FILED MAR. 24, 1909.
1,085,113.
Patented Jan. 27, 1914.
2 SHEETS—SHEET 2.
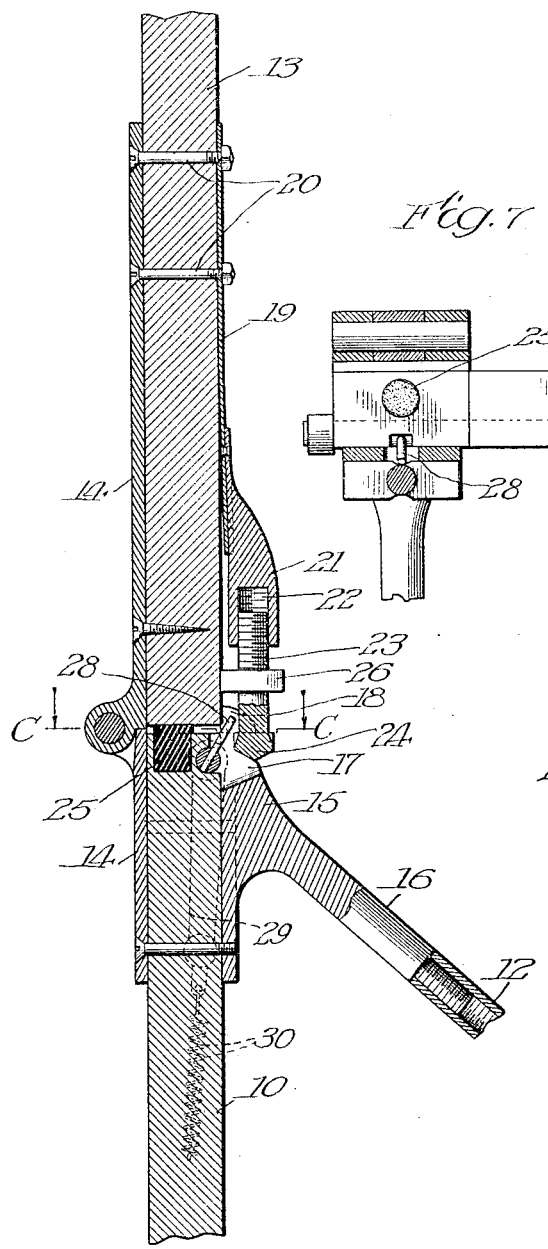
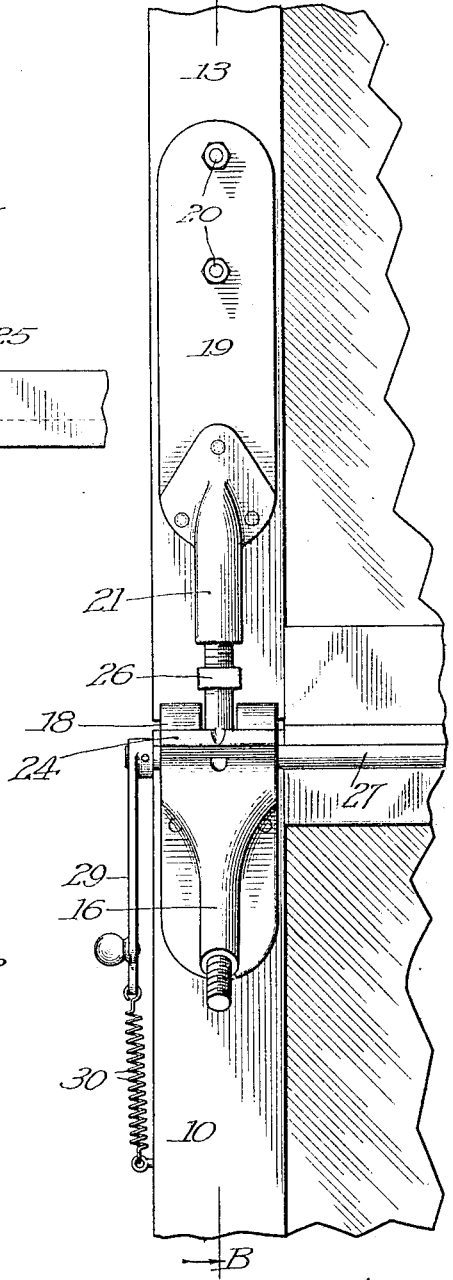

UNITED STATES PATENT OFFICE.

PHILIP de ANGUERA, JR., OF CHICAGO, ILLINOIS.

WIND-SHIELD.

1,085,113.  Specification of Letters Patent.  Patented Jan. 27, 1914.

Application filed March 24, 1909.  Serial No. 485,363.

*To all whom it may concern:*

Be it known that I, PHILIP DE ANGUERA, Jr., a citizen of the United States, and a resident of Chicago, in the county of Cook and State of Illinois, have invented certain new and useful Improvements in Wind-Shields, of which the following is a full, clear, and exact specification.

My invention is concerned with a novel catch mechanism for wind shields for automobiles, designed to hold the movable wind shield member in either its open or folded position, and is designed to produce a catch mechanism of the class described, which shall be simple in its construction, efficient in its operation and which cannot readily get out of order.

To illustrate my invention, I annex hereto two sheets of drawings in which the same reference characters are used to designate identical parts in all the figures, of which—

Figure 2:
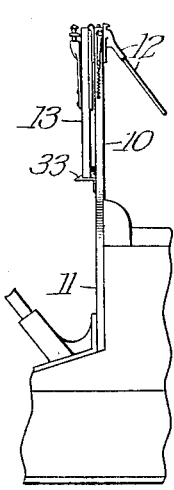
Figure 3:
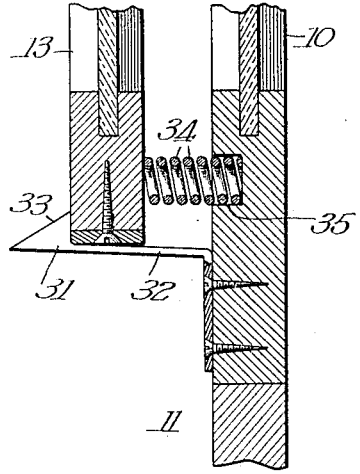
Figure 4:
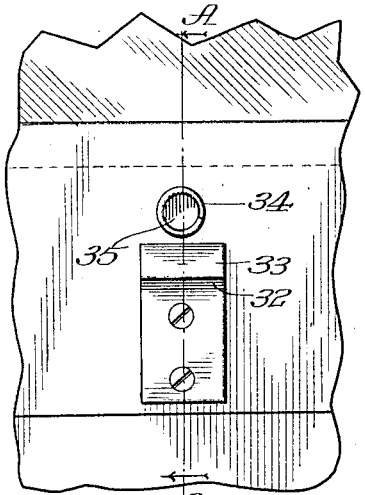

Figure 1 is a side elevation of the forward end of the automobile showing the wind shield in its elevated position; Fig. 2 is a portion of the same view, showing the wind shield in its down or folded position; Fig. 3 is an enlarged view of a portion of the mechanism shown in Fig. 2 in section on the line A—A of Fig. 4; Fig. 4 is a front elevation of a portion of the wind shield on the scale of Fig. 3; Fig. 5 is a detail in vertical section on the line B—B of Fig. 6; Fig. 6 is a front elevation of one side of the wind shield on a large scale; and Fig. 7 is a horizontal section on the line C—C of Fig. 5.

My invention is adapted to be employed in connection with an ordinary two part wind shield, the lower part, 10, of which is adapted to be secured to the dash board 11 of the automobile, and to be braced in position by the customary rods, 12. The upper board, 13, of the wind shield is hinged at its sides to the lower part, 10, by the strap hinges, 14.

While I have shown the ordinary single joint hinges as employed for this purpose, I may, if desired, use the double joint hinges, such as are covered by my Patent No. 851,591, dated July 19, 1907.

To lock the wind shield in its raised position, I secure on the lower portion 10, preferably on the wooden frame at the upper corner of each side, a rigid locking member 15, which may conveniently be made integral with the bracket arm 16, to which the brace 12 is secured. This locking member 15 is provided with a central slot 17 at its upper end, and with a pair of hooks 18. The spring catch locking member is preferably formed of a strong leaf spring 19, which is secured at its upper end to the sides of the upper shield member, preferably by the bolts 20 which serve to secure both it and the upper portion of the hinge 14 in place. Secured on the lower end of the leaf spring 19 is the socket 21, which is interiorly threaded at 22 to receive the threaded end 23 of the shank of the catch 24 which will be seen to consist of a bar having the flat upper side to coöperate with the flat underside of the hooks 18, while its under-side is made up of two correspondingly beveled surfaces, either of which is adapted to engage the coöperating and correspondingly beveled surface of the catch member 15. A plug 25 of rubber, or some similar resilient material, is inserted in the pocket in the upper edge of the lower wind shield member and projects into the plane of the lower edge of the upper wind shield member sufficiently so that when the upper member is up, the rubber 25 is compressed sufficiently to hold the bar 24 firmly in engagement with the hooks 18. The shank 23 is threaded into the socket 21 so that the position of the catch member 24 can be accurately adjusted and to hold it in any desired position of adjustment the rectangular block 26 is formed on said shank and coöperates with the face of the upper half 13 of the wind shield to prevent its turning accidentally.

In order to readily release the catch mechanism, I provide the rock shaft 27, which is journaled in the recess extending across the top of the lower shield member, and in the plane of the recesses 17 on each side I secure in said rock shaft 27 the pins 28 which serve when the shaft is rocked to engage the back of the shank 23 and force the catch bar 24 out of engagement with the hooks 18, thus permitting the upper member to be lowered. I provide on one or both ends of the rock shaft 27 the crank arm 29 by which the shaft may be conveniently rocked by the driver and to hold the pins 28 normally in their non-engaging position so as not to interfere with the catch being readily snapped back into position when the upper shield member is thrown up, I preferably provide the helically coiled contractile spring 30, which is secured at one end to the crank arm 29 and at the other end to the lower shield member 10.

To hold the shield member 13 in its down position and prevent its swinging when the car jolts, I provide on the lower edge of the lower sash member one or more hooks 31, which have the leaf spring portion 32 so that it can yield and the beveled surface 33 against which the edge of the upper shaft member 13 strikes as it swings down into position. To act as a buffer for the upper shield member if it is allowed to fall down into position, and also to hold it firmly against the shoulder of the hook 31 so as to prevent any rattling, I employ a helically coiled expanding spring 34 above each of the hooks 31 and suitably secured at one end to the lower shield member 10 conveniently by being inserted into the circular recess 35 formed therein.

While I have shown and described my invention as embodied in the form which I at present consider best adapted to carry out its purposes, it will be understood that it is capable of modifications, and that I do not desire to be limited in an interpretation of the following claims except as may be necessitated by the state of the prior art.

What I claim is new and desire to secure by Letters Patent of the United States is—

1. In a wind shield, the combination with a vertical fixed shield member, of a normally vertical movable shield member, horizontal hinges connecting said members, a rigid locking member attached to one of the shield members, a spring catch locking member on the other shield member, means for positively adjusting the relative position of the two locking members, and a cushioning means between the two shield members tending to separate them and holding the two locking members firmly in engagement.

2. In a wind shield, the combination with the fixed shield member, of a movable shield member, hinges connecting said members, a rigid hook catch attached to one of the shield members, a leaf spring secured at one end to the other shield member, a socket secured to the other end of the spring, and a catch member threaded into the socket and adapted to coöperate with the hook.

3. In a wind shield, the combination with the fixed shield member, of a movable shield member, hinges connecting said members, a rigid hook catch attached to one of the shield members, a leaf spring secured at one end to the other shield member, a socket secured to the other end of the spring, a catch member threaded into the socket and adapted to coöperate with the hook, and means for preventing the catch member from turning accidentally in said socket.

4. In a wind shield, the combination with the fixed shield member, of a movable shield member, hinges connecting said members, a rigid hook catch attached to one of the shield members, a leaf spring secured at one end to the other shield member, a socket secured to the other end of the spring, a catch member threaded into the socket and adapted to coöperate with the hook, and a flat surface carried by the catch member to coöperate with the shield member to prevent the catch member from turning in said socket accidentally.

5. In a wind shield, the combination with the fixed shield member, of a movable shield member, a pair of hinges, one at each end connecting said members, a pair of rigid hook catches attached to one of the shield members opposite the hinges, a corresponding pair of leaf springs secured at one of their ends to the other shield member opposite its hinges, a pair of catch members carried by the free ends of the leaf springs and adapted to coöperate with the hook catches, a rock shaft journaled adjacent the catch members and having a pair of eccentric arms engaging said catch members when the shaft is rocked, and means for holding the rock shaft yieldingly in one position.

6. In a wind shield, the combination with the fixed shield member, of a movable shield member, a pair of hinges, one at each end connecting said members, a pair of rigid hook catches attached to one of the shield members opposite the hinges, a corresponding pair of leaf springs secured at one of their ends to the other shield member opposite its hinges, a pair of catch members carried by the free ends of the leaf springs and adapted to coöperate with the hook catches, a rock shaft journaled adjacent the catch members and having a pair of eccentric arms engaging said catch members when the shaft is rocked, and means for holding the rock shaft yieldingly in one position, consisting of a spring secured at one end to the rock shaft and at the other end to the shield member.

In witness whereof, I have hereunto set my hand and affixed my seal, this 18th day of March A. D. 1909.

PHILIP de ANGUERA, Jr. [L. S.]

Witnesses:
JOHN HOWARD McELROY,
F. E. BROM.